United States Patent [19]

Burger et al.

[11] 4,391,555
[45] Jul. 5, 1983

[54] PROCESS FOR CONSOLIDATING GEOLOGICAL FORMATIONS

[75] Inventors: Jacques Burger, Bougival; Charles Bardon; Claude Gadelle, both of Rueil-Malmaison, all of France

[73] Assignee: Institut Francais du Petrole, Rueil-Malmaison, France

[21] Appl. No.: 219,604

[22] Filed: Dec. 24, 1980

[30] Foreign Application Priority Data

Dec. 28, 1979 [FR] France ................ 79 32018

[51] Int. Cl.³ .................. E02D 3/12; E21B 33/138
[52] U.S. Cl. .................................. 405/264; 166/288; 166/294; 166/300
[58] Field of Search ............... 166/270, 288, 294, 295, 166/300; 405/264; 106/95

[56] References Cited

U.S. PATENT DOCUMENTS 3,180,412  4/1965  Bernarski et al. ............ 166/260
3,269,461  8/1966  Strange et al. ................ 166/288
3,360,041  12/1967 Santourian .................... 166/260
3,388,743  6/1968  Engle ............................. 166/260
3,490,530  1/1970  Dean et al. .................... 166/260
3,941,191  3/1976  Pusch ......................... 166/260 X Primary Examiner—Stephen J. Novosad
Assistant Examiner—George A. Suchfield
Attorney, Agent, or Firm—Millen & White, P.C.

[57] ABSTRACT

This process comprises injecting into the formations a liquid organic mixture containing at least a polymerizable chemical compound and a catalyst. The organic mixture reacts with a limited amount of an injected oxidizing gas to give a solid product which consolidates the formations without substantially reducing their permeability. The catalyst is characterized by the combination of at least one element of the group constituted by barium, zirconium, cerium, and lanthanides (e.g. lanthanum) and at least one element selected from the group formed by vanadium, manganese, iron, cobalt and zinc.

22 Claims, 1 Drawing Figure

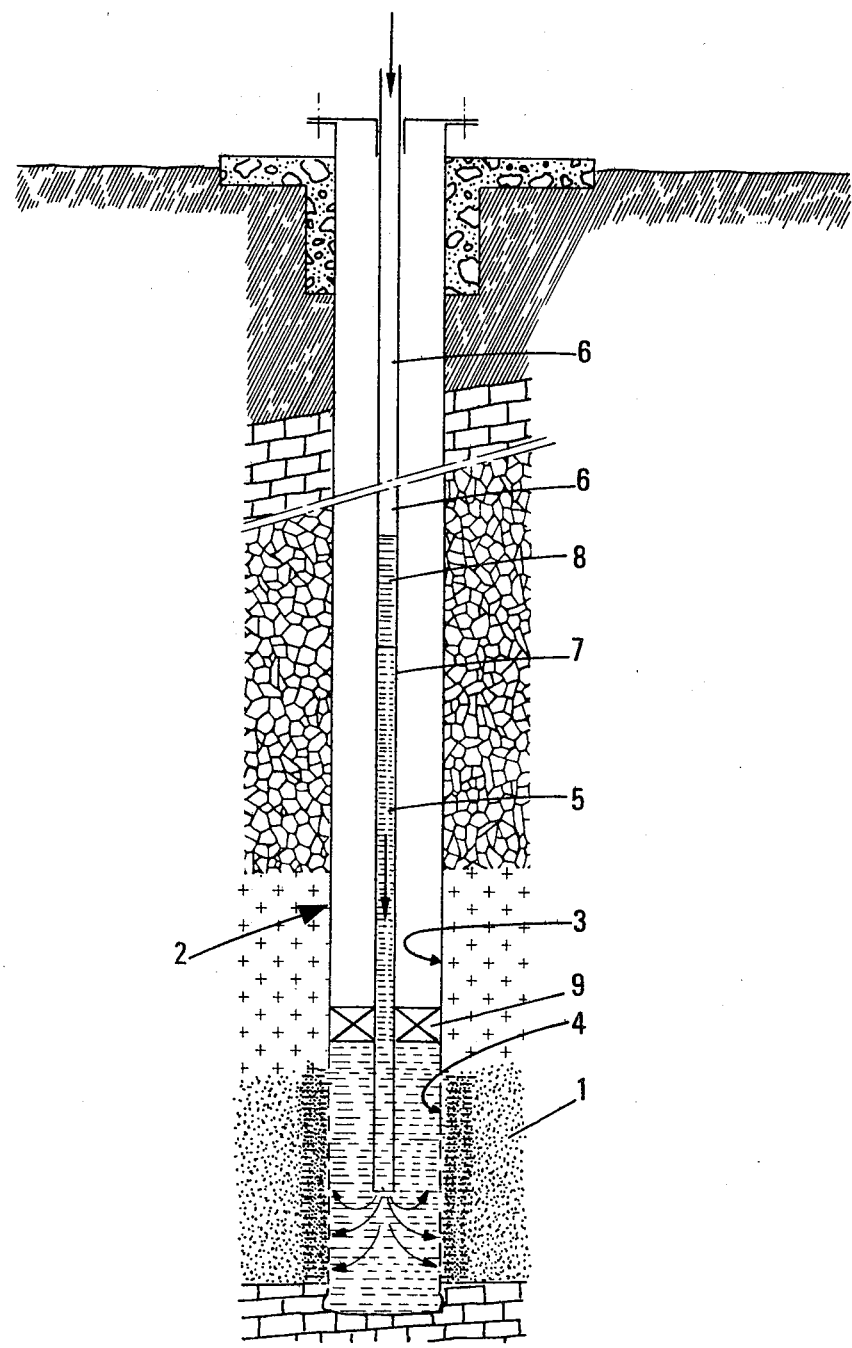

PROCESS FOR CONSOLIDATING GEOLOGICAL FORMATIONS

BACKGROUND OF THE INVENTION

The present invention relates to a process for consolidating geological formations, this process being in particular applicable to oil and gas reservoirs, to prevent sand from flowing into a well traversing unconsolidated, or insufficiently consolidated, sand formations.

More generally this process can be used to locally consolidate permeable formations.

Various methods have been proposed to prevent sand from flowing into new boreholes, or to treat wells liable to be subjected to sand flowing during exploitation of oil or gas deposits.

A first type of method consists of maintaining the sand by mechanical means, using artificial screens with calibrated apertures, or packs of gravels having a well-defined size distribution, depending on the size of the sand particles or grains of the geological formation traversed by the borehole. Such a method is very often applied to new wells, but is difficult to put into operation.

A second type of method consists of injecting into the geological formation a liquid resin which by polymerization creates a bond between the sand grains.

The efficiency of a chemical method of this second type is uncertain, since the reaction of polymerization of the injected resin depends essentially on the conditions prevailing in the borehole at the level of the formation and on the characteristics of the latter. Thus, such a method does not permit control of the extent of the chemical reaction.

There is thus the risk either of an insufficient consolidation of the formation if the degree of polymerisation of the resin is not sufficient, or of an excessive reduction of the permeability of the geological formation, or even of complete plugging thereof, if a too great an amount of polymer is retained in some of the pores of the formation.

Another method, which is described in British Pat. No. 975,229, consists of successively introducing into the formation a material consisting essentially of an unsaturated fatty acid, then an oxygenated gas, with a view toward obtaining a resinification of said material.

However a proper consolidation is obtained by this method only if the formation to be consolidated is at a temperature comprising between 150° and 300° C., or is heated to such a temperature which is much higher than the normal temperature of oil or gas reservoirs.

It has also been contemplated in this prior patent to add a catalyst made of cobalt naphthenate, or manganese naphthenate.

Even in this last case the so obtained consolidation is really satisfactory only if the temperature of the formations is sufficiently high.

U.S. Pat. No. 3,388,743 also discloses a consolidation method wherein injection of a drying oil into formations surrounding a borehole is followed by the injection of an oxidizing gas.

The partially oxidized oil constitutes a good binding material for the sand particles.

By using an oxidizing catalyst, such as lead or cobalt naphthenate it is possible to shorten the time required for oxidizing the oil.

However, the consolidation obtained by application of this method is generally insufficient for the object at which it is aimed.

From French Pat. No. 1,409,599 also teaches a process for consolidating the grounds wherein these grounds are treated by oily polymers containing siccative or drying catalysts which are hardened by air drying on the surface of the ground to be consolidated.

This treatment which produces hard, impermeable ground masses is however not suitable for consolidating subterranean formations whose permeability must be preserved.

SUMMARY OF THE INVENTION

The object of the present invention is accordingly to provide a simple and reliable process for consolidating a geological formation without substantially reducing its permeability, this process being applicable to ground formations whose characteristics may vary within a rather wide range.

This method is particular suitable for treating oil or gas wells where sand flowing is likely to occur.

This result is obtained, according to the invention by controlling the chemical alteration of a polymerizable material.

This process comprises injecting into the formation a liquid mixture of organic products of which is achieved in situ a moderate chemical alteration by contacting this liquid mixture with a determined quantity of an oxidizing gas, so as to transform said liquid mixture by an exothermic reaction into a substance which binds the unconsolidated elements of the formation, the injection of the oxidizing gas permitting avoidance of any substantial reduction in the permeability of this formation relative to oil or natural gas. The composition of the liquid mixture, as well as the oxygen content and the quantity of oxidizing gas are adjusted so as to enable the reaction to start at the normal temperature of the formation, and so as to control the extent of oxidizing reaction of polymerization of the liquid mixture.

More particularly the invention provides a method for consolidating a geological formation comprising the following two successive steps:

(a) injecting into the formation a liquid organic mixture containing at least one polymerizable chemical compound and a catalyst, this mixture being capable of being subjected in situ into contact with an oxidizing gas, to cause a chemical reaction, starting at the normal temperature of the geological formation and thereby producing a solid product which consolidates the formation without substantially reducing its permeability, and (b) injecting a sufficient quantity of an oxidizing gas to achieve substantially complete solidification of said organic liquid, this quantity being however, limited so that the temperature reached in the formation during said reactions does not exceed 350° C. and preferably comprises between 150° C. and 250° C.

The process according to the invention is characterized in that said liquid organic mixture contains a catalyst comprising in combination at least one element of the group formed by barium, zirconium, cerium, and lanthanides (e.g. lanthanum) and at least one element selected from the group formed by vanadium, manganese, iron, cobalt and zinc.

From the above-defined catalysts, the following catalysts appeared to be particularly suitable for carrying out the invention: the combination of cerium (optionally with the addition of at least a lanthanide) and cobalt, the combinations of zirconimum and cobalt, cerium and manganese, barium and manganese.

The process according to the invention is efficient even if the temperature of the formation (which is in particular dependent on its depth) is low, since the reaction of oxidation of the organic material causes a sufficient heat release in the treated zone, so as to reach the minimum thermal level enabling the organic mixture to be efficiently polymerized, and providing a proper cohesion between the grains of the geological formation.

Moreover, the oxygen content of the injected oxidizing gas and the amount of oxygen introduced into the formation are controlled so as to not exceed the maximum temperature which would lead to degradation of the polymerized material.

The organic mixture used in the process according to the invention may advantageously be constituted by a drying oil, optionally diluted by an organic solvent, a catalyst as above defined being added to this oil.

The utilized drying oil will advantageously be linseed oil, tung oil (wood oil), safflower oil, or more generally vegetable oils having a high content in polyethylenic compounds. The employed solvents will be constituted, for example, by hydrocarbons such a benzene, toluene, xylene, or by a petroleum cut; the solvent content will advantageously be comprised between 0 and 50% to limit the reactivity decrease resulting from dilution.

The components of the catalyst will be used in the form of salts such as carboxylates, naphthenates, sulfonates, octoates, etc., all soluble in the basic components of the organic mixture. The content of the solution in each of the metals used in the catalyst will be smaller than 3 percent by weight and preferably comprised between 0.007 and 2 percent by weight. The exact composition of the catalyst (selected metals and respective contents thereof) will depend on the nature of the surrounding medium, and on the conditions prevailing in the deposit (pressure, temperature, etc.).

The amount of the injected organic mixture will be preferably smaller than 500 liters per meter of thickness of the geological formations, however, larger quantities will not decrease the efficiency of the method according to the invention.

In the application of the method to oil reservoirs, the injected oxidizing gas will be preferably oxygen or air, optionally diluted with nitrogen, carbon dioxide or another gas which is chemically inert under the operating conditions. In the application of the method to gas reservoirs, the used oxidizing gaseous mixture will preferably by oxygen or air diluted by nitrogen, another inert gas or dry natural gas; however, the content in natural gas must be such that the gaseous mixture remains outside the limits of its explosive range during the test conditions.

The volumetric oxygen content of the gaseous mixture will advantageously comprise between 0.5 and 100%, preferably between 1 and 21%. The oxygen content for a given composition of the organic mixture will preferably be reduced as the injection pressure increases. The presence of water in the gaseous mixture will be avoided by a suitable drying treatment, if necessary.

Proportioning of the oxidizing mixture will be effected at the ground surface, the components of the mixture being either supplied from the compressed gas or cryogenic gas bottles or delivered by compressors.

The oxygen volume in the injected gas, measured under standard temperatures and pressure conditions, will preferably be smaller than 200 liters per liter of injected organic mixture; excellent results are obtained by using between 10 and 80 liters of oxygen, per liter of organic mixture.

BRIEF DESCRIPTION OF THE DRAWING

The FIGURE is a diagrammatic illustration showing how the process of the invention is carried out.

DETAILED DISCUSSION OF THE INVENTION

In the enclosed FIGURE, which diagrammatically illustrates an embodiment of the process according to the invention, reference 1 designates a sandy geological formation traversed by a well 2, which comprises a casing 3 provided with apertures 4 at the level of the formation 1 from which a fluid, such as oil or natural gas, is to be extracted.

In this embodiment the process according to the invention is carried out by successively injecting into the treated formation 1 predetermined quantities of an organic material 5, such as a drying oil to which a catalyst (as above-defined) has been added, optionally in admixture with another organic liquid, such as a solvent or a petroleum cut and an oxidizng gas, such as air or oxygen diluted as above indicated.

The organic liquid mixture and the gas may be injected one after the other through the same production tubing 7, which opens at its lower end substantially at the lower level of the apertures 4.

Packer means 9 provides for sealing of the annular space between the casing 3 and the production tubing 7, above the formation 1.

In the tubing 7 the oxidizing gas is separated from the organic mixture through a plug 8 of a material which is little or not oxidable, this plug being for example, constituted by a small volume of solvent or of a petroleum cut in an oil well, or of natural gas in a gas well.

It is thus possible to prevent reactions of the organic mixture from occurring in the production tubing iteself.

Obviously the above described embodiment is by no way limitatitve and other embodiments may be contemplated.

Generally speaking, the liquid injected at 5 is an organic mixture which upon contact with an oxidizing gas is capable to participate to a chemical alteration starting at the temperature of the formation 1 which leads to a consolidation of the formation in the vicinity of the well.

The liquid 5 is more easily alterable by the oxidizing mixture than the hydrocarbons contained in the formation, and than the basic organic compounds which do not contain any catalyst, thus resulting in the consolidation of the formation.

In the case of oil deposits, it will be advantageous before injecting the liquid 5 to inject fluids such as xylene, or a petroleum cut and an alcohol, such as isopropanol, in order to drive away oil and water present in the vicinity of the well, since excessive quantities of such oil and water may be detrimental to the efficiency of the consolidation of the medium.

The quantity of injected oxidizing gas will be determined so as to obtain complete solidification of the organic liquid 5, while preventing the temperature reached in the formation from exceeding 350° C., as a result of the evolved heat. Burning of the organic liquid 5 is thus avoided in accordance with the invention, thereby preventing any degradation of the polymerization product and providing for the protection of the well equipment, particularly of the casing 3.

The efficiency of the process according to the invention is illustrated by the following tests, the characteristics of the operating mode during these tests being by no way limitative.

TEST NO. 1

An intimate mixture of quarry sand (grain size comprised between 150 and 300 microns) and of linseed oil is packed at ambient temperature, in a vertical tube having a thin wall, 20 cm in diameter and 15 cm in height. Heating collars are positioned around the tube over the height occupied by the mixture, so as to control lateral thermal losses. In the case of a temperature increase the electric power delivered to the collars is adjusted so that the temperature measured within the mixture does not differ by more than 10° C. from the temperature measured at the same level against the wall of the tube.

The solid mass obtained by packing a mixture of 7.2 Kg sand and 0.63 Kg linseed oil has a porosity of 38% and a degree of saturation with linseed oil equal to about 40% of the pore volume. Its initial temperature is 20° C.

An air flow rate of 1.55 liter/minute is injected under atmospheric pressure through the upper end of the tube during 7 hours.

No decrease in the oxygen content of the gaseous effluent and no temperature increase of the impregnated porous medium could be ascertained.

At the end of the test it appeared that solid mass remained unconsolidated.

It is thus apparent that under the selected operating conditions, no reaction occurs in the solid mass impregnated with linseed oil without catalyst.

TEST NO. 2

A test similar to TEST NO. 1 was effected using sand impregnated with linseed oil containing 0.06 percent by weight of cobalt naphthenate.

Air was injected under atmospheric pressure during 8 hours at a rate of 1.6 liter/minute. An important fraction of the oxygen contained in the injected gas was used by the oxidation reactions. These reactions caused a progressive temperature rise in the porous medium up to 140° C.; then the temperature decreased as the oxygen content of the gaseous effluent rised.

It was ascertained that the pressure drop during the flow through the solid mass was substantially the same as before, during and after the test, which shows that the permeability of the medium remained unchanged.

At the end of the test it appeared that the medium was consolidated; crushing resistance of the so-obtained cores was 22 bars.

It appears that the reaction which occurs with linseed oil containing a cobalt salt provides for some mechanical resistance of the solid mass.

TEST NO. 3

A test similar to the test No. 1 was carried out with sand impregnated with linseed oil containing 0.12 percent by weight of cerium and 0.06 percent by weight of cobalt, both in the form of naphthenates Air was injected under atmospheric pressure during 8 hours and 45 minutes at a rate of 1.5 l/min. During the test an important oxygen consumption and a temperature rise up to a maximum temperature of 160° C. were ascertained. It appeared that the pressure drop in the fluid flow through the solid mass remained substantially the same before, during and after the test.

It was verified that consolidation of the medium was excellent. Crushing resistance of the so-obtained cores was 70 bars, their cohesion was not altered by a flow of crude oil and water; their permeability was comprised between 3 and 3.7 DARCY.

Thus it appears that the reaction produced with linseed oil containing the above-defined catalyst results in an excellent cohesion of the solid mass, this cohesion being substantially greater than the cohesion obtained in the preceding test.

TEST NO. 4

A test similar to the test No. 1 was carried out with sand impregnated with linseed oil containing 0.12 percent by weight of zirconium and 0.03 percent by weight of cobalt, both in the form of naphthenates.

Air was injected under atmospheric pressure during 10 hours at a rate of 1.5 l/min. The oxidation reaction produces a temperature rise up to a maximum temperature of 143° C. At the end of the test it was verified that the medium had kept its permeability and that its consolidation was excellent; its resistance to compression was 68 bars.

The catalyst used during this test gives similar results to those in TEST NO. 3.

TEST NO. 5

An intimate mixture of washed sand and of liquid organic mixture was packed at ambient temperature in a vertical tube with a thin wall and 12.5 cm in diameter, forming the inner housing of a high pressure cylindrical cell. The inner tube was provided with heating collars and with a thermal insulating lining to compensate for thermal losses as the solid mass is heated.

The organic mixture used was linseed oil containing 0.14 percent by weight of cerium, 0.16 percent by weight of other lanthanides (lanthanum, praseodyme, neodyme, samarium) in the form of octoates, and 36 percent by weight of cobalt naphthenate.

The relative pressure in the cell was raised to 10 bars and air was injected during 7.5 hours at a rate of 3 liters/minute (standard temperature and pressure conditions).

The reaction resulted in a temperature rise up to 168° C. After the test it was ascertained that the medium had kept its permeability and was perfectly consolidated, its resistance to compression was 180 bars.

The utilized catalyst gives remarkable results under the operating conditions of this test which are similar to those which may be connected in practice at the bottom of a well.

TEST NO. 6

A test was effected in the apparatus described for TEST NO. 5 with quarry sand containing 5% kaolinite and using as an organic mixture linseed oil containing 0.40% percent by weight of manganese octoate.

The duration of this test, which was carried out under a relative pressure of 10 bars and with an air flow rate of 3 liters/minutes (standard conditions), was 7 hours.

The temperature measured within the solid mass, which was initially equal to 20° C., increased as a result of the developing exothermic reaction, and this temperature reached a maximum value of 216° C. However at the end of the test only the 5 first centimeters of the solid mass had reached some cohesion, the resistance to the crushing of cores from this part of the solid mass was 30 bars.

TEST NO. 7

A test was carried out with operating conditions similar to those of TEST NO. 6, but this time using as an organic mixture linseed oil containing 0.3 percent by weight of cerium naphthenate and 0.4 percent by weight of manganese octoate. The test duration was 7 hours.

The reaction produced a temperature rise within the solid mass, up to a maximum value of 218° C. At the end of the test it was ascertained that the solid mass has kept its permeability and was strongly consolidated within its whole mass.

Resistance to crushing of the so-obtained cores was of 70 bars.

TEST NO. 8

A test similar to the TEST NO. 5 was carried out, using as an organic mixture this time, tung oil containing 0.14 percent by weight of cerium, 0.16 percent by weight of other lanthanides tlanthanum, praseodyme, neodyme, samarium in the form of octoates) and 0.36 percent by weight of cobalt naphthenate.

The relative pressure in the cell was raised to 10 bars and air was injected during 7 hours 15 minutes at a rate of 3 liters/minute. The reaction resulted in a temperature rise up to 200° C.

After the test it was ascertained that the medium was perfectly consolidated. Its resistance to crushing was 80 bars.

TEST NO. 9

Water and crude oil (density 0.87) were added to a sandy mineral support in such proportions as to obtain a mixture having water and oil contents both equal to 7 percent by weight. The mixture was placed and packed in the cell described in relation with TEST NO. 5.

After partial displacement of the impregnating fluids by a plug of isopropylalcohol, there was injected an organic mixture formed by linseed oil containing 0.18 percent by weight of zirconium and 0.72 percent by weight of cobalt both in the form of naphthenates. The relative pressure in the cell was then raised to 10 bars and air was injected during 26 hours at a rate of 1.5 liter/minute (standard conditions). The reaction produced a temperature rise up to 300° C. after 10 hours; the electric supply of the heating collars was then interrupted until the end of the test.

The so-obtained medium had kept its permeability and was consolidated; its resistance to crushing was 80 bars.

TEST NO. 10

A catalyst was added to a mixture of 80% linseed oil and 20% xylene, so as to obtain of solution containing 0.30 percent by weight of cerium and 0.42 percent by weight of cobalt both in the form of naphthenates; this liquid organic mixture was mixed with sand and placed into the cell described in relation with TEST NO. 5.

The relative pressure in the cell was then raised to 60 bars.

An oxygenated gas formed by a mixture of air and nitrogen containing 4% oxygen was injected during 7.25 hours at a rate of 14 liters/minute (standard conditions). The reaction caused a temperature rise up to 245° C. The so-obtained medium was properly consolidated at the end of the test; its resistance to compression was 48 bars.

This test shows that the process according to the invention may be performed under much higher pressure while controlling the chemical reactions by a proper adjustment of the oxygen content of the gaseous mixture.

TEST NO. 11

A test was carried out under the same conditions as for TEST NO. 6, but using this time as an organic mixture linseed oil containing 0.25 percent by weight of barium and 0.4 percent by weight of manganese both in the form of octoates.

The duration of this test was 7 hours.

The reaction caused a temperature rise of the solid mass to a maximum of 226° C.

After the test it appeared that the medium had kept its initial permeability and was properly consolidated throughout its volume.

The so-obtained cores had a resistance to compression of 72 bars.

What is claimed is:

1. A process for consolidating a geological formation, comprising the following two successive steps:
   (a) injecting into the formation a liquid organic mixture containing at least one polymerizable chemical compound, said mixture being capable to be subjected in situ at the contact of an oxidizing gas, to reactions starting at the normal temperature of the formation and leading to the production of a solid product which consolidates said formation without substantially reducing its permeability, and
   (b) injecting an oxidizing gas in a sufficient amount to produce substantially complete solidification of said organic liquid, said amount being limited so that the temperature reached in the formation during said reaction does not exceed 350° C., and wherein said liquid organic mixture contains a catalyst which comprises in combination: (a) at least one element of barium, zirconium, cerium, or lanthanides and (b) at least one element of vanadium, manganese, iron, cobalt or zinc.

2. In a process for consolidating a geological formation comprising injecting into the formation a liquid organic mixture containing at least one polymerizable chemical compound, and injecting, in situ, at the contact of an oxidizing gas, to cause reactions starting at the normal temperature of the formation and leading to the production of a solid product which consolidates this formation without substantially reducing its permeability, the improvement wherein the organic mixture injected contains a catalyst comprising in combination: (a) at least one of barium, zirconium, cerium, or a lanthanide, and (b) at least one of vanadium, manganese, iron, cobalt, or zinc.

3. A process according to claim 1 or 2, wherein said catalyst comprises in combination cerium and cobalt.

4. A process according to claim 2, wherein said catalyst further comprises as a third element a lanthanide element.

5. A process according to claim 1 or 2, wherein said catalyst comprises in combination zirconium and cobalt.

6. A process according to claim 2, wherein said catalyst comprises in combination cerium and manganese.

7. A process according to claim 1 or 2, wherein said catalyst comprises in combination barium and manganese.

8. A process according to claim 1 or 2, wherein said elements in the catalyst are in the form of salts soluble in the basic components of said liquid organic mixture.

9. A process according to claim 8, wherein said salts comprise at least one of carboxylates, naphthenates, sulfonates and octoates.

10. A process according to claim 1 or 2, wherein said at least one polymerizable chemical compound comprises a drying oil.

11. A process according to claim 10, wherein said oil is diluted by an organic solvent comprising at least one of benzene, toluene, xylene, and a petroleum cut.

12. A process according to claim 11, wherein said solvent comprises no more than 50% of a mixture with said oil.

13. A process according to claim 1 or 2, wherein said at least one polymerizable chemical compound comprises linseed oil.

14. A process according to claim 13, wherein said oil is diluted by an organic solvent comprising at least one of benzene, toluene, xylene, and a petroleum cut.

15. A process according to claim 14, wherein said solvent comprises no more than 50% of a mixture with said oil.

16. A process according to claim 1 or 2, wherein said at least one polymerizable chemical compound comprises wood oil.

17. A process according to claim 16, wherein said oil is diluted by an organic solvent comprising at least one of benzene, toluene, xylene, and a petroleum cut.

18. A process according to claim 17, wherein said solvent comprises no more than 50% of a mixture with said oil.

19. A process according to claim 2, comprising injecting oxidizing gas wherein the amount of oxidizing gas injected is such that the temperature of the reaction in the formation does not exceed 350° C.

20. A process according to claim 1 or 2, wherein the amount of catalyst in the liquid organic mixture is less than 3 percent by weight.

21. A process according to claim 20, wherein the amount of catalyst in the liquid organic mixture comprises 0.007–2 percent by weight.

22. A process according to claim 2 wherein said catalyst comprises cerium and cobalt, and further comprises lanthanum.

* * * * *

UNITED STATES PATENT AND TRADEMARK OFFICE
CERTIFICATE OF CORRECTION

PATENT NO. : 4,391,555
DATED : July 5, 1983
INVENTOR(S) : Jacques Burger et al

It is certified that error appears in the above-identified patent and that said Letters Patent is hereby corrected as shown below:

Column 8, lines 49-50: read "chemical compound, and injecting, in situ, at the contact of an oxidizing gas, to cause reactions starting at "

Column 8, lines 49-50: should read -- chemical compound, and injecting, in situ, an oxidizing gas, to cause reactions starting at --

Signed and Sealed this

Twenty-seventh Day of September 1983

[SEAL]

Attest:

GERALD J. MOSSINGHOFF

Attesting Officer　　Commissioner of Patents and Trademarks